US012562016B2

(12) United States Patent
Yagi

(10) Patent No.: US 12,562,016 B2
(45) Date of Patent: Feb. 24, 2026

(54) ELECTRONIC VOTING SYSTEM, ELECTRONIC VOTING METHOD, AND ELECTRONIC VOTING PROGRAM

(71) Applicant: NEC Corporation, Tokyo (JP)

(72) Inventor: Shinjiro Yagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

(21) Appl. No.: 18/693,212

(22) PCT Filed: Sep. 30, 2021

(86) PCT No.: PCT/JP2021/036127
§ 371 (c)(1),
(2) Date: Mar. 19, 2024

(87) PCT Pub. No.: WO2023/053339
PCT Pub. Date: Apr. 6, 2023

(65) Prior Publication Data
US 2024/0282160 A1 Aug. 22, 2024

(51) Int. Cl.
*G07C 13/00* (2006.01)
*H04L 9/08* (2006.01)
*H04L 9/32* (2006.01)
(52) U.S. Cl.
CPC ............ *G07C 13/00* (2013.01); *H04L 9/0825* (2013.01); *H04L 9/321* (2013.01); *H04L 9/3247* (2013.01)
(58) Field of Classification Search
CPC ....... G07C 13/00; H04L 9/0825; H04L 9/321; H04L 9/3247

(Continued)

(56) References Cited

U.S. PATENT DOCUMENTS

2008/0105742 A1    5/2008  Kim et al.
2012/0261470 A1*  10/2012  Valles Fontanals ... G07C 13/00
                                                           235/386

(Continued)

FOREIGN PATENT DOCUMENTS

JP      2003-067532  A      3/2003
JP      2004-192029  A      7/2004
JP      2019-095884  A      6/2019

OTHER PUBLICATIONS

International Search Report for PCT Application No. PCT/JP2021/036127, mailed on Dec. 21, 2021.

*Primary Examiner* — Daniel A Hess
(74) *Attorney, Agent, or Firm* — Sughrue Mion, PLLC

(57) ABSTRACT

An electronic voting system that transmits and receives data to and from an electronic voting terminal(s) with which a voter(s) performs electronic voting includes: a voting right management apparatus that issues a voting ID(s) to the voter(s) based on a voter list; a voting processing apparatus that receives, from the electronic voting terminal(s), electronic voting information in which an electronic signature(s) is attached to the voting ID(s) and a ballot content(s), checks the electronic signature(s) against the voting ID(s) and the ballot content(s) to perform identity verification of the voter(s), and records data obtained by removing the voting ID(s) and the electronic signature(s) from the electronic voting information as ballot data; and at least three secret sharing server apparatuses that record the voting ID(s), the ballot content(s), and the electronic signature(s) in a secret-sharing manner.

20 Claims, 4 Drawing Sheets

(58) Field of Classification Search
USPC ........................................................... 235/51
See application file for complete search history.

(56) References Cited

U.S. PATENT DOCUMENTS

| 2018/0350180 A1* | 12/2018 | Onischuk ............... G07C 13/00 |
| 2019/0305938 A1* | 10/2019 | Sandberg-Maitland ..................... |
| | | H04L 9/085 |
| 2020/0228344 A1 | 7/2020 | Sun et al. |
| 2024/0153332 A1* | 5/2024 | Etou ..................... H04L 9/3239 |

* cited by examiner

ELECTRONIC VOTING SYSTEM, ELECTRONIC VOTING METHOD, AND ELECTRONIC VOTING PROGRAM

This application is a National Stage Entry of PCT/JP2021/036127 filed on Sep. 30, 2021, the contents of all of which are incorporated herein by reference, in their entirety.

FIELD

The present invention relates to an electronic voting system, an electronic voting method, and an electronic voting program.

BACKGROUND

In anonymous voting as typified by elections, ballot papers are typically used. This is because voting in an election strictly requires the prevention of multiple voting and the assurance of anonymity, and use of ballot papers achieves the prevention of multiple voting and the assurance of anonymity. To realize so-called electronic voting in which anonymous voting as typified by an election is digitized, the prevention of multiple voting and the assurance of anonymity are also required, as in an election using ballot papers.

For example, a typical election adopts a mechanism in which, instead of mailing ballot papers to voters, an organization sends a mail that can be exchanged with a ballot paper at a polling station to the individual voter. The individual voter who has received his or her mail exchanges it with a ballot paper at a polling station and casts the ballot paper in a ballot box. With this mechanism, although the addresses and the names of the voters are indicated in the delivered mails, the voters can perform their voting without writing their name on a ballot paper, and as a result, anonymity is ensured. In addition, by sending the mails that can be exchanged with ballot papers only to the persons listed in a voter list and by collecting the mails at the time of the exchange with the ballot papers, multiple voting can be prevented.

In electronic voting, the prevention of multiple voting and the assurance of anonymity described above need to be implemented as electronic processing. For example, Patent Literature (PTL) 1 discloses mechanisms of voting tokens, electronic signatures, etc., used for the prevention of multiple voting and the assurance of anonymity.

PTL 1: Japanese Unexamined Patent Application Publication No. 2019-095884A

SUMMARY

The disclosure of the above PTL is incorporated herein by reference thereto. The following analysis has been made by the present inventors.

Electronic voting requires reliability in a perspective different from that of conventional voting using ballot papers. That is, ballot contents need to be verified. For example, when there is a possibility that fraudulent voting has been committed, the ballot contents need to be verified after the voting. However, since electronic voting handles electronic data, a perspective different from that of paper voting arises. In voting using ballot papers, it is impossible to conduct a fraud such as rewriting a ballot paper in a ballot box from the outside. However, in electronic voting, it is necessary to ensure reliability in view of a possibility of rewriting ballot data from the outside and a possibility of unexpected data corruption.

However, it is difficult to verify the ballot contents in anonymized ballot data. For example, it is practically impossible to check whether data of the vote of a person who is not listed in the voter list is included or whether the vote of the same person is redundantly included, by using anonymized ballot data.

In view of the above problem, an object of the present invention is to provide an electronic voting system, an electronic voting method, and an electronic voting program that contribute to verifying a ballot content(s) in anonymous voting.

Solution to Problem

In a first aspect of the present invention, there is provided an electronic voting system that transmits and receives data to and from an electronic voting terminal(s) with which a voter(s) performs electronic voting, the electronic voting system including: a voting right management apparatus that issues a voting ID(s) to the voter(s) based on a voter list; a voting processing apparatus that receives, from the electronic voting terminal(s), electronic voting information in which an electronic signature(s) is attached to the voting ID(s) and a ballot content(s), checks the electronic signature(s) against the voting ID(s) and the ballot content(s) to perform identity verification of the voter(s), and records data obtained by removing the voting ID(s) and the electronic signature(s) from the electronic voting information as ballot data; and at least three secret sharing server apparatuses that record the voting ID(s), the ballot content(s), and the electronic signature(s) in a secret-sharing manner.

In a second aspect of the present invention, there is provided an electronic voting method using an electronic voting system that transmits and receives data to and from an electronic voting terminal(s) with which a voter(s) performs electronic voting, the electronic voting method including: causing the electronic voting system to issue a voting ID(s) to the voter(s) based on a voter list; causing the electronic voting system to receive, from the electronic voting terminal(s), electronic voting information in which an electronic signature(s) is attached to the voting ID(s) and a ballot content(s); causing the electronic voting system to check the electronic signature(s) against the voting ID(s) and the ballot content(s) to perform identity verification of the voter(s); causing the electronic voting system to record data obtained by removing the voting ID(s) and the electronic signature(s) from the electronic voting information as ballot data; and causing the electronic voting system to record the voting ID(s), the ballot content(s), and the electronic signature(s) in a secret-sharing manner.

In a third aspect of the present invention, there is provided an electronic voting program causing an electronic voting system that transmits and receives data to and from an electronic voting terminal(s) with which a voter(s) performs electronic voting to perform processing for: issuing a voting ID(s) to the voter(s) based on a voter list; receiving, from the electronic voting terminal(s), electronic voting information in which an electronic signature(s) is attached to the voting ID(s) and a ballot content(s); checking the electronic signature(s) against the voting ID(s) and the ballot content(s) to perform identity verification of the voter(s); recording data obtained by removing the voting ID(s) and the electronic signature(s) from the electronic voting information as ballot data; and recording the voting ID(s), the ballot content(s), and the electronic signature(s) in a secret-sharing manner. This program can be recorded in a computer-readable storage medium. The storage medium may be a non-transitory storage medium such as a semiconductor memory, a hard disk, a magnetic recording medium, or an optical recording medium. The present invention can be embodied as a computer program product.

According to the individual aspects of the present invention, it is possible to provide an electronic voting system, an electronic voting method, and an electronic voting program that contribute to verifying a ballot content(s) in anonymous voting.

EXAMPLE EMBODIMENTS

Figure 1:
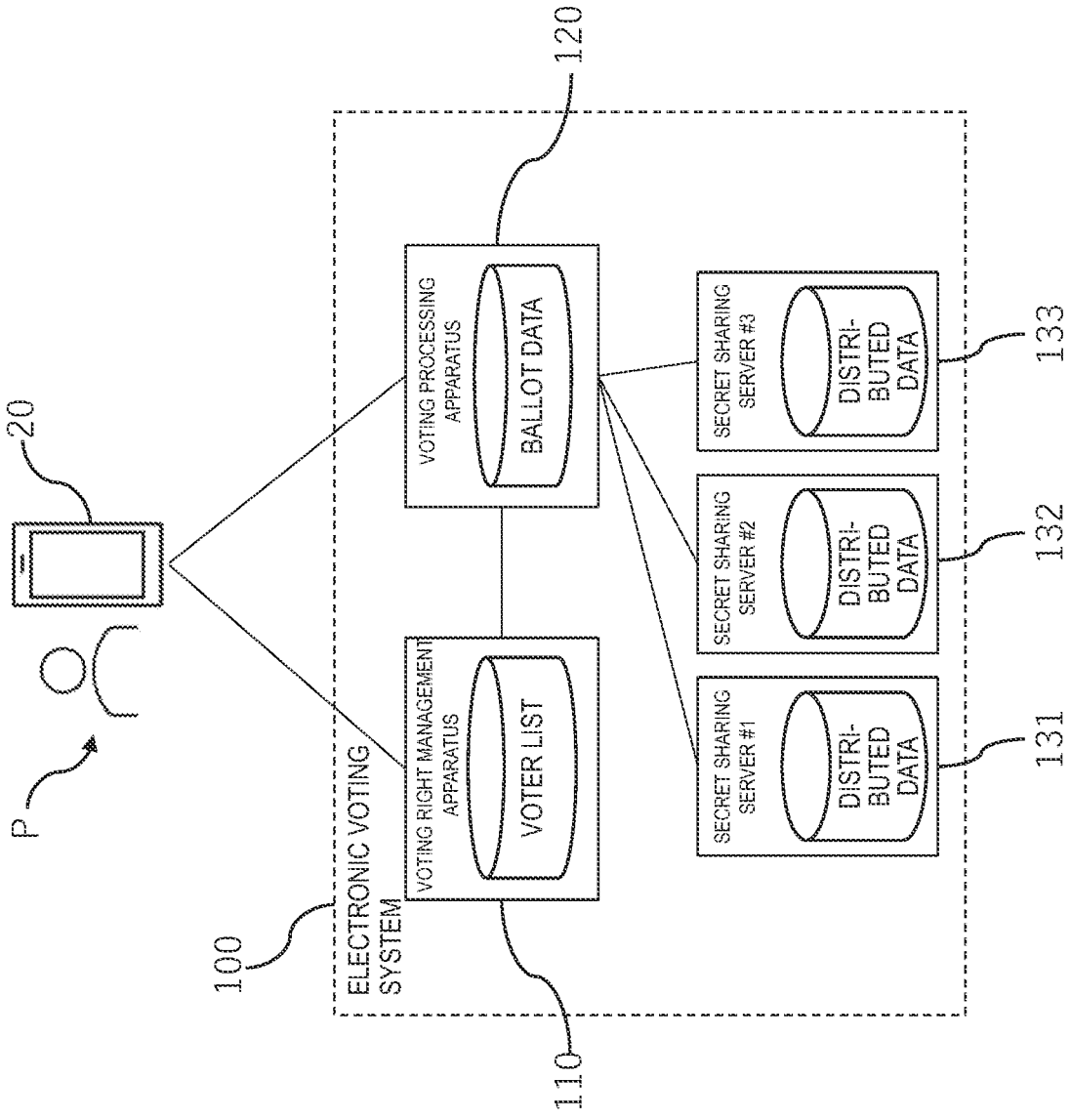
FIG. 1 is a diagram schematically illustrating an electronic voting system according to a first example embodiment.

Hereinafter, example embodiments of the present invention will be described with reference to the accompanying drawings. However, the present invention is not limited to the following example embodiments. In addition, in the drawings, the same or equivalent elements are denoted by the same reference characters, as necessary. In addition, the drawings are schematic drawings, and therefore, it should be noted that the sizes, ratios, etc. of the individual elements may differ from their actual sizes, ratios, etc. An element in a drawing may have a portion whose size or ratio differs from that of the portion of the element in a different drawing.

First Example Embodiment

FIG. 1 is a diagram schematically illustrating an electronic voting system according to a first example embodiment. As described in FIG. 1, an electronic voting system 100 includes a voting right management apparatus 110, a voting processing apparatus 120, and secret sharing servers 131, 132, and 133. Although the first example embodiment assumes that the electronic voting system 100 transmits and receives data to and from an electronic voting terminal 20 with which a voter P performs electronic voting and computerizes a typical election, the electronic voting system 100 can also be applied to other voting in general, such as an anonymous questionnaire, which needs the prevention of multiple voting and the assurance of anonymity.

The voting right management apparatus 110 issues a voting ID to the voter P based on a voter list. The first example embodiment assumes that the voting ID is a number or a character string. However, a nickname or a name may be used in the case of a questionnaire or the like, as long as privacy and security are secured. The voting right management apparatus 110 may issue the voting ID in the form of a bar code, an electronic token, or the like, instead of directly issuing a number, a character string, or the like.

The voting processing apparatus 120 receives, from the electronic voting terminal 20, electronic voting information in which an electronic signature is attached to the voting ID and a ballot content, checks the electronic signature against the voting ID and the ballot content to perform identity verification of the voter P, and records data obtained by removing the voting ID and the electronic signature from the electronic voting information, that is, the ballot content, as ballot data. The ballot content may be the name of an applicant in the case of an election or may be the content of a response in the case of a questionnaire.

The term "electronic signature" is an electronic record that is attached to an electronic document in order to prove the creator of this electronic document. In public-key cryptography, which is typically used as a mechanism for realizing an electronic signature, an electronic document or a hash value thereof is encrypted by using a private key that only the creator of the electronic document knows. When the ciphertext encrypted by the private key that only this creator knows is decrypted by using a public key, if the original electronic document or the hash value thereof is obtained, this ciphertext is successfully proved to be the electronic document created by the authentic creator. By using this mechanism, the voting processing apparatus 120 checks the electronic signature against the voting ID and the ballot content to perform identity verification of the voter P.

After performing the identity verification of the voter P by using the above method, the voting processing apparatus 120 queries the voting right management apparatus 110 to check whether the status of the voting ID corresponding to the voter P is "voted". If the status of the voting ID corresponding to the voter P is not "voted", the voting right management apparatus 110 changes the status of the voting ID corresponding to the voter P to "voted" and invalidates the voting ID corresponding to the voter P. In this way, the electronic voting system 100 prevents multiple voting.

In addition, after performing the identity verification of the voter P by using the above method, the voting processing apparatus 120 records, as ballot data, the ballot content included in the electronic voting information. Since the first example embodiment assumes that the electronic voting system 100 is applied to anonymous voting, the voting ID and the electronic signature are not necessary. Thus, the voting processing apparatus 120 removes the voting ID and the electronic signature, which can specify the voter P, from the electronic voting information and records the remaining data as ballot data. In this way, the electronic voting system 100 ensures anonymity.

Furthermore, the voting processing apparatus 120 records the voting ID, the ballot content, and the electronic signature in at least the three secret sharing servers 131, 132, and 133 in a secret-sharing manner. Secret sharing is a technique for maintaining secrecy by distributing secret information to each participant. Information called "shares" generated from secret information are given to the individual participants. The number of these shares generated match the number of participants. The shares are generated such that the original secret information cannot be reconstructed even if an individual share is obtained but can be reconstructed if a sufficient number of shares are obtained.

For example, in the simplest method for performing secret sharing among the three secret sharing servers 131, 132, and 133, secret information a is first decomposed as $a = a_1 + a_2 + a_3$ mod7. Next, $(a_1, a_2)$ is recorded in the secret sharing server 131, $(a_2, a_3)$ is recorded in the secret sharing server 132, and $(a_3, a_1)$ is recorded in the secret sharing server 133. In this way, the secret information a cannot be reconstructed only with the data recorded in one of the secret sharing servers 131, 132, and 133. However, the secret information a can be reconstructed by combining the data in at least two of the three secret sharing servers 131, 132, and 133. Various kinds of techniques of such secret sharing are known, and a technique may be appropriately selected and used depending on the application of the electronic voting system 100. More than three secret sharing servers may be needed in some cases.

It is possible to compute the secret information distributed in a secret-sharing manner as described above while maintaining the secrecy. The computation performed with the secrecy maintained is commonly called secure computation. In secure computation, any operations are theoretically possible. This is because AND operations and OR operations can be performed in secure computation. However, it is complicated to decompose all computations into AND operations and OR operations, and therefore, a secret sharing technique suitable for a needed secure computation may be appropriately selected and used.

By using secure computation, the secret sharing servers 131, 132, and 133 can reaggregate the vote IDs, the ballot contents, and the electronic signatures and can verify an aggregated result obtained by using the ballot data aggregated by the voting processing apparatus 120. In addition, the secret sharing servers 131, 132, and 133 can verify the consistency between the voting ID and the voting ID issued by the voting right management apparatus by using secure computation. Furthermore, the secret sharing servers 131, 132, and 133 can verify the consistency among the voting ID, the ballot content, and the electronic signature by using secure computation. As described above, the electronic voting system 100 according to the present example embodiment can verify that the data recorded in the ballot data is appropriate while achieving the prevention of multiple voting and the assurance of anonymity.

It is preferable that the communication between the voting processing apparatus 120 and the electronic voting terminal 20 be encrypted in accordance with the security required by the application of the electronic voting. If the communication between the voting processing apparatus 120 and the electronic voting terminal 20 is intercepted, the ballot content of the voter P could be leaked. Therefore, when the present invention is applied to voting that requires a high level of security, it is preferable that the communication be encrypted. While the entire communication between the voting processing apparatus 120 and the electronic voting terminal 20 can be encrypted, if the security of the application is secured, only the ballot content may be encrypted, and an electronic signature may be attached to the encrypted ballot content.

Figure 2:
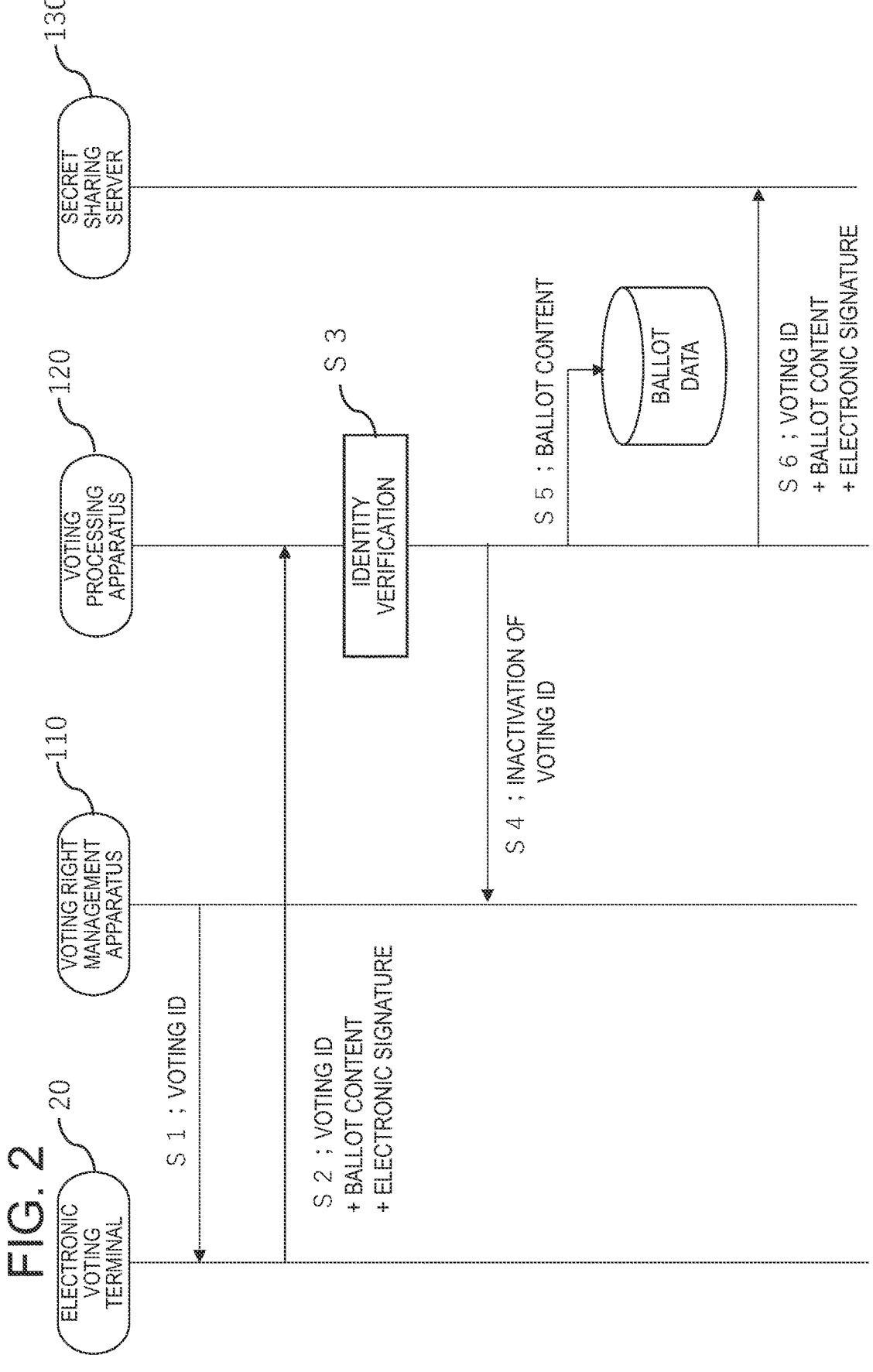
FIG. 2 is a system flowchart schematically illustrating an electronic voting method according to the first example embodiment.

FIG. 2 is a system flowchart schematically illustrating an electronic voting method according to the first example embodiment. The electronic voting method illustrated in FIG. 2 uses the electronic voting system 100 that transmits and receives data to and from the electronic voting terminal 20 with which a voter performs electronic voting. The electronic voting system 100 includes the voting right management apparatus 110, the voting processing apparatus 120, and a secret sharing server 130. FIG. 2 illustrates an outline of processing performed by the electronic voting terminal 20, the voting right management apparatus 110, the voting processing apparatus 120, and the secret sharing server 130. The secret sharing server 130 represents the secret sharing servers 131, 132, and 133 in FIG. 1, and does not limit the actual number of secret sharing servers.

As illustrated in FIG. 2, in step S1, the voting right management apparatus 110 issues a voting ID to the voter P based on a voter list, and transmits the voting ID to the electronic voting terminal 20.

Next, in step S2, by using the electronic voting terminal 20, the voter P attaches an electronic signature to the voting ID and a ballot content and transmits the voting ID, the ballot content, and the electronic signature to the voting processing apparatus 120.

In step S3, the voting processing apparatus 120 checks the electronic signature against the voting ID and the ballot content to perform identity verification of the voter P.

Next, in step S4, the voting processing apparatus 120 queries the voting right management apparatus 110 to check whether the status of the voting ID corresponding to the voter P is "voted". If the status of the voting ID corresponding to the voter P is not "voted", the voting right management apparatus 110 changes the status of the voting ID corresponding to the voter P to "voted" and invalidates the voting ID corresponding to the voter P. In this way, the electronic voting system 100 prevents multiple voting.

In step S5, the voting processing apparatus 120 records the ballot content included in the electronic voting information as ballot data. In other words, the voting processing apparatus 120 removes the voting ID and the electronic signature, which can specify the voter P, from the electronic voting information and records the remaining data as ballot data, so as to ensure anonymity.

Next, in step S6, the voting processing apparatus 120 transmits the voting ID, the ballot content, and the electronic signature to the secret sharing server 130. The secret sharing server 130 records the voting ID, the ballot content, and the electronic signature in a secret-sharing manner.

As described above, the electronic voting method according to the present example embodiment can verify that the data recorded in the ballot data is appropriate while achieving the prevention of multiple voting and the assurance of anonymity.

[Hardware Configuration Example]

Figure 3:
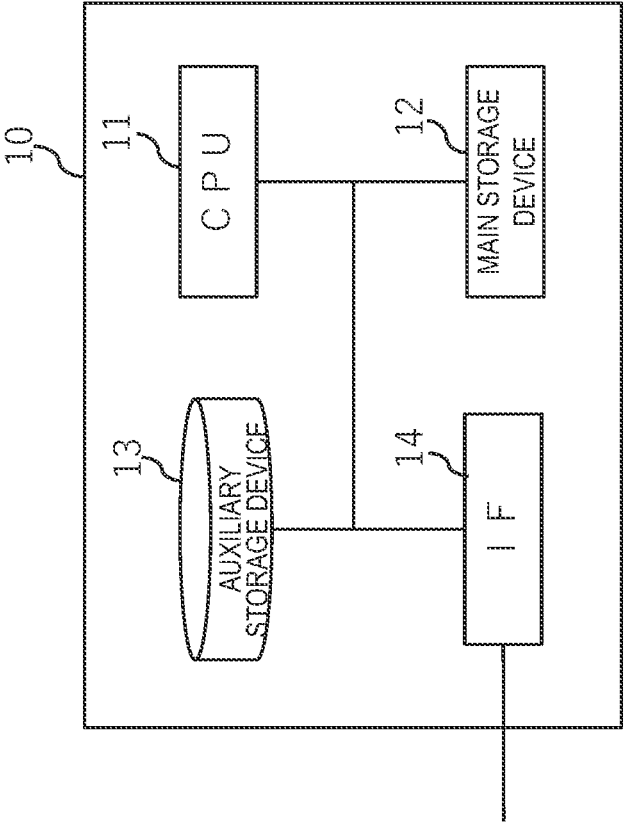
FIG. 3 is a diagram illustrating an example of a hardware configuration of an individual apparatus used in an example embodiment.

FIG. 3 is a diagram illustrating an example of a hardware configuration of an individual apparatus used in an example embodiment. Concretely, an individual function of any one of the voting right management apparatus 110, the voting processing apparatus 120, and the secret sharing servers 131, 132, and 133 can be realized by causing an information processing apparatus (a computer) adopting the hardware configuration illustrated in FIG. 3 to execute the above-described electronic voting method as a program. However, the hardware configuration illustrated in FIG. 3 is an example of the hardware configuration for realizing the individual function of any one of the voting right management apparatus 110, the voting processing apparatus 120, and the secret sharing servers 131, 132, and 133, and does not limit the hardware configuration of the voting right management apparatus 110, the voting processing apparatus 120, and the secret sharing servers 131, 132, and 133. The voting right management apparatus 110, the voting processing apparatus 120, and the secret sharing servers 131, 132, and 133 may include hardware not illustrated in FIG. 3.

As illustrated in FIG. 3, a hardware configuration 10 that can be adopted by the voting right management apparatus 110, the voting processing apparatus 120, and the secret sharing servers 131, 132, and 133 includes a CPU (Central Processing Unit) 11, a main storage device 12, an auxiliary storage device 13, and an IF (Interface) part 14 that are connected to each other by, for example, an internal bus.

The CPU 11 executes commands included in an electronic voting program executed by the voting right management apparatus 110, the voting processing apparatus 120, and the secret sharing servers 131, 132, and 133. The main storage device 12 is, for example, a RAM (Random Access Memory) and temporarily stores various kinds of programs such as a homomorphic cyclic operation program executed by the voting right management apparatus 110, the voting processing apparatus 120, and the secret sharing servers 131, 132, and 133 such that these programs can be processed by the CPU 11.

The auxiliary storage device 13 is, for example, an HDD (Hard Disk Drive) and can store various kinds of programs such as a homomorphic cyclic operation program executed by the voting right management apparatus 110, the voting processing apparatus 120, and the secret sharing servers 131, 132, and 133 for a medium to long term. Various kinds of programs such as the electronic voting program can be provided as a program product recorded in a non-transitory computer-readable storage medium.

The auxiliary storage device 13 can also store data used for the electronic voting method. That is, the auxiliary storage device 13 can be used by the voting right management apparatus 110 to store the voter list, can be used by the voting processing apparatus 120 to store the ballot data, and can be used by the secret sharing servers 131, 132, and 133 to store the secret sharing data.

The IF part 14 provides an interface relating to input and output among the voting right management apparatus 110, the voting processing apparatus 120, and the secret sharing servers 131, 132, and 133, for example.

Information processing apparatuses adopting the hardware configuration 10 as described above realize the individual functions of the voting right management apparatus 110, the voting processing apparatus 120, and the secret sharing servers 131, 132, and 133, for example by executing the above-described electronic voting method as a program.

Second Example Embodiment

Figure 4:
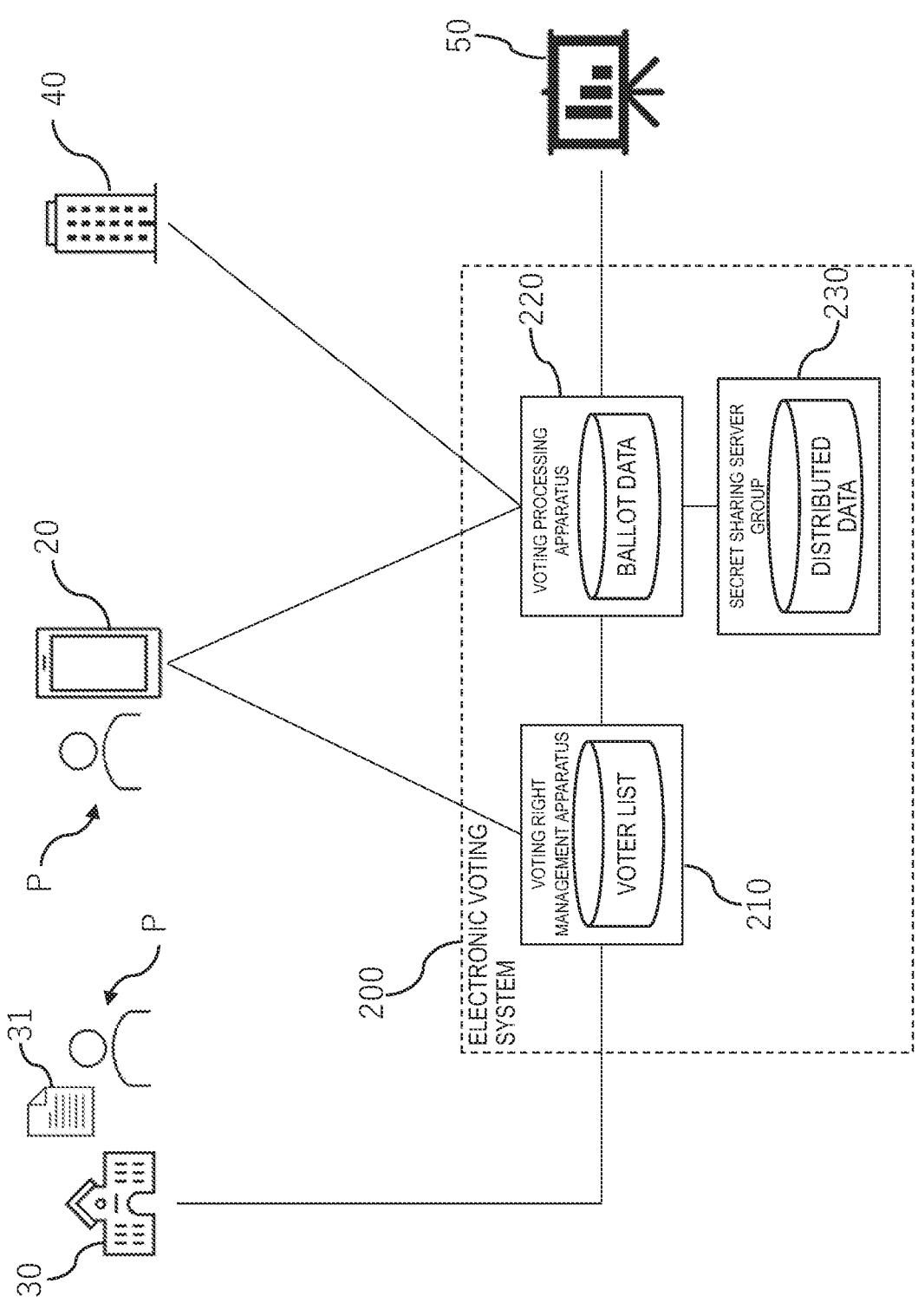
FIG. 4 is a diagram schematically illustrating an electronic voting system according to a second example embodiment.

FIG. 4 is a diagram schematically illustrating an electronic voting system according to a second example embodiment. An electronic voting system 200 according to the second example embodiment is an example embodiment closer to voting in an actual election.

As illustrated in FIG. 4, the electronic voting system 200 includes a voting right management apparatus 210, a voting processing apparatus 220, and a secret sharing server group 230. The electronic voting system 200 processes electronic voting performed by a voter P using an electronic voting terminal 20 and prevents multiple voting even when the voter P casts a vote by using a ballot paper 31 at a polling station 30.

The voting right management apparatus 210 issues a voting ID to the voter P based on a voter list. The voting ID is used in either in electronic voting or voting using the ballot paper 31. For example, the voting ID on the ballot paper 31 can be created by printing a bar code or the like.

The voting processing apparatus 220 receives, from the electronic voting terminal 20, electronic voting information in which an electronic signature is attached to the voting ID and a ballot content, and checks the electronic signature against the voting ID and the ballot content to perform identity verification of the voter P.

For the electronic signature, a pair of a private key and a public key issued by a public organization is used. For example, there is a system called "Individual Number Card" in Japan, and a pair of a private key and a public key issued by a public organization is stored in an IC chip embedded in each individual number card. For the electronic signature, this pair of a private key and a public key can be used via a commonly used electronic terminal such as a smartphone.

It is preferable to use electronic signatures, each of which uses such a pair of a private key and a public key issued by a public organization, in electronic voting for elections.

Further, the voting processing apparatus 220 queries a third-party certificate authority 40 to confirm that the electronic signature received from the electronic voting terminal 20 is valid. Even with the electronic signature described above, there is a risk that the voter P may be impersonated by forging the pair of a private key and a public key. However, there is a mechanism called public key infrastructure (PKI) for assuring the correspondence relation between the public key and the owner of the public key. By using this mechanism, the voting processing apparatus 220 first queries the third-party certificate authority to verify the authenticity of the public key of the voter associated with the voting ID and next performs identity verification.

After performing the identity verification of the voter P by using the above method, the voting processing apparatus 220 queries the voting right management apparatus 210 to check whether the status of the voting ID corresponding to the voter P is "voted". If the status of the voting ID corresponding to the voter P is not "voted", the voting processing apparatus 220 changes the status of the voting ID corresponding to the voter P to "voted" and invalidates the voting ID corresponding to the voter P.

The voting ID managed by the voting processing apparatus 220 is used in either in electronic voting or voting using the ballot paper 31. As described above, if the voting processing apparatus 220 confirms that the electronic voting has been conducted, the voting processing apparatus 220 rejects voting using the ballot paper 31 at the polling station 30. On the contrary, if voting using the ballot paper 31 at the polling station has already been performed, the status of the voting ID corresponding to the voter P indicates "voted", and the response to the query from the voting processing apparatus 220 to the voting right management apparatus 210 also indicates "voted". Therefore, the voting processing apparatus 220 can refuse to accept electronic voting. In this way, the electronic voting system 200 prevents multiple voting of electronic voting and voting using the ballot paper 31.

Next, the voting processing apparatus 220 records data obtained by removing the voting ID and the electronic signature from the electronic voting information, that is, the ballot content, as ballot data. The voting processing apparatus 220 does not disclose the ballot data before a voting deadline. However, information such as a turnout rate at a certain time can be disclosed by a dashboard system 50. Further, once the voting deadline has passed, the ballot data can be made public as open data since the ballot data includes no personal information or the like.

The voting processing device 220 records the voting ID, the ballot content, and the electronic signature in the secret sharing server group 230 in a secret-sharing manner. The mechanisms of secret sharing and secret computation by the secret sharing server group 230 are the same as those in the first example embodiment, and thus, the description thereof will be omitted here.

The disclosure of the above PTL, etc. referred to in the above is incorporated herein by reference thereto. Modifications and adjustments of the example embodiments or examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been concretely disclosed. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST 100, 200 electronic voting system
110, 210 voting right management apparatus
120, 220 voting processing apparatus
130, 131, 132, 133 secret sharing server
230 secret sharing server group
10 hardware configuration
11 CPU
12 main storage device
13 auxiliary storage device
14 IF part
20 electronic voting terminal
30 polling station
31 ballot paper
40 third-party certificate authority
50 dashboard system
P voter

What is claimed is:

1. An electronic voting system that transmits and receives data to and from an electronic voting terminal(s) with which a voter(s) performs electronic voting, the electronic voting system comprising:

a voting right management apparatus that issues a voting ID(s) to the voter(s) based on a voter list;

a voting processing apparatus that receives, from the electronic voting terminal(s), electronic voting information in which an electronic signature(s) is attached to the voting ID(s) and a ballot content(s), checks the electronic signature(s) against the voting ID(s) and the ballot content(s) to perform identity verification of the voter(s), and records data obtained by removing the voting ID(s) and the electronic signature(s) from the electronic voting information as ballot data; and at least three secret sharing server apparatuses that record the voting ID(s), the ballot content(s), and the electronic signature(s) in a secret-sharing manner.

2. The electronic voting system according to claim 1, wherein the voting right management apparatus invalidates the voting ID(s) based on an identity verification result(s) obtained by the voting processing apparatus.

3. The electronic voting system according to claim 1, wherein, based on a result(s) of voting using a ballot paper(s) at a polling station(s), the voting right management apparatus invalidates the corresponding voting ID(s) associated with the ballot paper(s).

4. The electronic voting system according to claim 1, wherein, by using secure computation, the secret sharing server apparatuses reaggregate the voting ID(s), the ballot content(s), and the electronic signature(s) and verify an aggregated result obtained by using the ballot data.

5. The electronic voting system according to claim 1, wherein the secret sharing server apparatuses verify consistency between the voting ID(s) in the electronic voting information and the voting ID(s) issued by the voting right management apparatus by using secure computation.

6. The electronic voting system according to claim 1, wherein the secret sharing server apparatuses verify consistency among the voting ID(s), the ballot content(s), and the electronic signature(s) by using secure computation.

7. The electronic voting system according to claim 1, wherein the voting processing apparatus first queries a third-party certificate authority to verify authenticity of a public key(s) of the voter(s) associated with the voting ID(s) and next performs identity verification.

8. The electronic voting system according to claim 1, wherein a pair(s) of a private key(s) and a public key(s) used for the electronic signature(s) is issued by a public organization.

9. An electronic voting method using an electronic voting system that transmits and receives data to and from an electronic voting terminal(s) with which a voter(s) performs electronic voting, the electronic voting method comprising:

causing the electronic voting system to issue a voting ID(s) to the voter(s) based on a voter list;

causing the electronic voting system to receive, from the electronic voting terminal(s), electronic voting information in which an electronic signature(s) is attached to the voting ID(s) and a ballot content(s);

causing the electronic voting system to check the electronic signature(s) against the voting ID(s) and the ballot content(s) to perform identity verification of the voter(s);

causing the electronic voting system to record data obtained by removing the voting ID(s) and the electronic signature(s) from the electronic voting information as ballot data; and causing the electronic voting system to record the voting ID(s), the ballot content(s), and the electronic signature (s) in a secret-sharing manner.

10. The electronic voting method according to claim 9, further comprising:

causing the electronic voting system to invalidate the voting ID(s) based on an identity verification result(s) obtained by a voting processing apparatus.

11. The electronic voting method according to claim 9, further comprising:

causing the electronic voting system to invalidate, based on a result(s) of voting using a ballot paper(s) at a polling station(s), the corresponding voting ID(s) associated with the ballot paper(s).

12. The electronic voting method according to claim 9, further comprising:

causing the electronic voting system to reaggregate the voting ID(s), the ballot content(s) by using secure computation, and the electronic signature(s) and verify an aggregated result obtained by using the ballot data.

13. The electronic voting method according to claim 9, further comprising:

causing the electronic voting system to verify consistency between the voting ID(s) in the electronic voting information and the voting ID(s) issued by the electronic voting system by using secure computation.

14. The electronic voting method according to claim 9, further comprising:

causing the electronic voting system to verify consistency among the voting ID(s), the ballot content(s), and the electronic signature(s) by using secure computation.

15. A non-transitory computer readable medium storing an electronic voting program causing an electronic voting system that transmits and receives data to and from an electronic voting terminal(s) with which a voter(s) performs electronic voting to perform processing for:

issuing a voting ID(s) to the voter(s) based on a voter list;

receiving, from the electronic voting terminal(s), electronic voting information in which an electronic signature(s) is attached to the voting ID(s) and a ballot content(s);

checking the electronic signature(s) against the voting ID(s) and the ballot content(s) to perform identity verification of the voter(s);

recording data obtained by removing the voting ID(s) and the electronic signature(s) from the electronic voting information as ballot data; and recording the voting ID(s), the ballot content(s), and the electronic signature(s) in a secret-sharing manner.

16. The non-transitory computer readable medium storing the electronic voting program according to claim 15, the processing further comprising:

invalidating the voting ID(s) based on an identity verification result(s) obtained by a voting processing apparatus.

17. The non-transitory computer readable medium storing the electronic voting program according to claim 15, the processing further comprising:

invalidating, based on a result(s) of voting using a ballot paper(s) at a polling station(s), the corresponding voting ID(s) associated with the ballot paper(s).

18. The non-transitory computer readable medium storing the electronic voting program according to claim 15, the processing further comprising:

reaggregating the voting ID(s), the ballot content(s) by using secure computation, and the electronic signature(s) and verifying an aggregated result obtained by using the ballot data.

19. The non-transitory computer readable medium storing the electronic voting program according to claim 15, the processing further comprising:

verifying consistency between the voting ID(s) in the electronic voting information and the voting ID(s) issued by the electronic voting system by using secure computation.

20. The non-transitory computer readable medium storing the electronic voting program according to claim 15, the processing further comprising:

verifying consistency among the voting ID(s), the ballot content(s), and the electronic signature(s) by using secure computation.

* * * * *